3,496,090
INJECTION AND COLLECTION PRESSURE CONTROL IN CONTINUOUS ELECTROPHORESIS APPARATUS
Allen Strickler, Fullerton, Calif., assignor to Beckman Instruments, Inc., a corporation of California
Filed July 5, 1967, Ser. No. 651,241
Int. Cl. B01k 5/00
U.S. Cl. 204—299          10 Claims

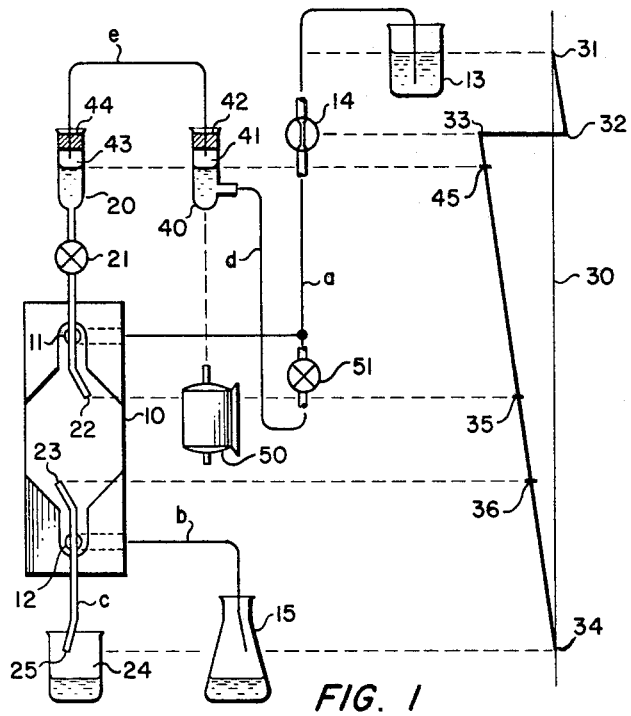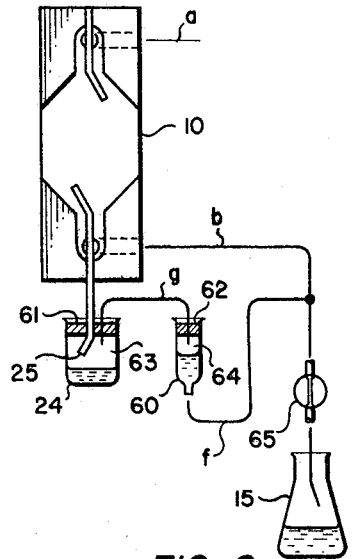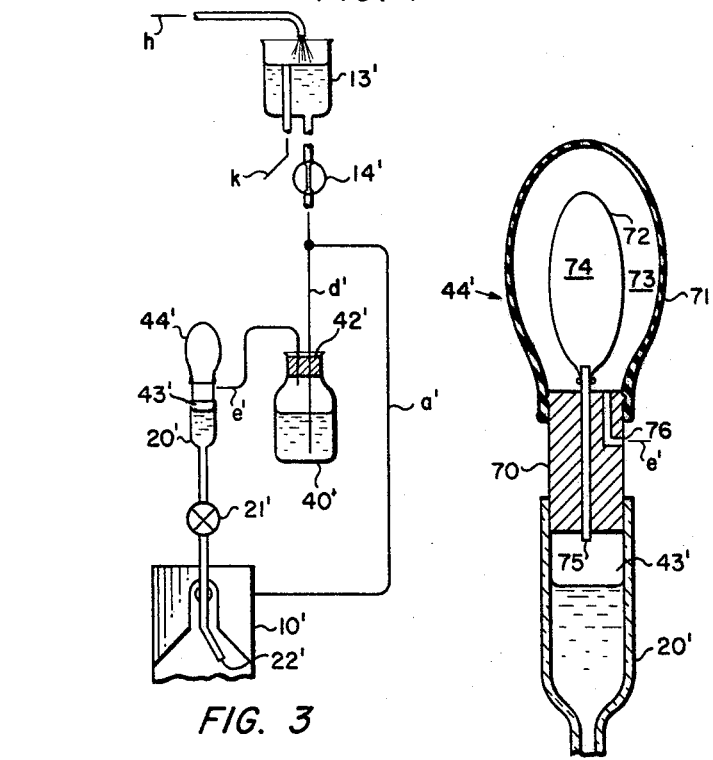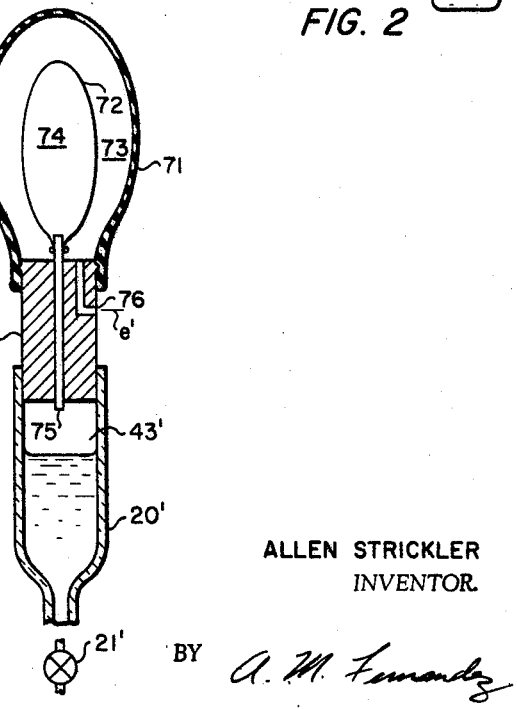
FIG. 1
FIG. 2
FIG. 3
FIG. 4
ALLEN STRICKLER
INVENTOR.
BY A. M. Fernandez
ATTORNEY United States Patent Office 3,496,090
Patented Feb. 17, 1970

ABSTRACT OF THE DISCLOSURE

A sample injection and/or fraction collection pressure system in a continuous particle electrophoresis apparatus is provided by a closed ballast container connected to an electrolyte system. Air space in the ballast container is connected to a closed air space over the sample in a short vertical tube for injection pressure control, and to a closed air space around the outlet of a short vertical fraction collection tube. A special device may be used to enclose the air space over the sample which, when removed from the sample tube to pour sample there, will not allow air to be drawn into the electrolyte system if the ballast container is connected to that system at a point of subatmospheric pressure.

---

The present invention relates to a system for controlling the injection and collection pressures in a continuous particle electrophoresis apparatus.

Electrophoresis is a process which can be used to separate small charged particles. For operation, it relies on the differential migration, under the influence of an electric field, of the particles or ions in an electrolyte medium in which a sample containing the particles is initially localized.

One form of apparatus which has been developed for accomplishing electrophoretic separation is termed "continuous free-flow particle electrophoresis," or more simply, "continuous particle electrophoresis" apparatus because the electrolyte is made to flow freely as a continuous and uniform sheet or curtain within the electric field. A sample is then continuously injected at some point upstream in the electrolyte curtain which flows in a direction normal to the potential gradient of the electric field. The sample particles are separated into bands in the electrolyte curtain under the influence of the electric field, the particles of each band assuming a position depending upon their electrophoretic mobility. The particles of one or more selected bands are collected in a vessel referred to as a fraction collector.

In the use of continuous particle electrophoresis apparatus, it is necessary to vary or adjust with some precision the relative pressures in the sample tube from which the sample is injected into the electrophoretic curtain. It is also desirable to vary or adjust with some precision the relative pressures of the fraction collector, or more particularly the effluent pressure at the outlet of a collector tube provided to collect the desired band of particles in order to control the collection flow rate and the amount of electrolyte or curtain width drawn into the collector tube.

For the sample tube, it is best to have a short vertical connection to an injection outlet at the upper end of the electrophoresis cell with a minimum restriction therein to minimize particle settling and clogging. For convenience, the sample tube is left open to atmospheric pressure.

At the bottom of the electrophoretic cell the collector tube vents to a fraction collector. As with the sample tube, it is desirable to have the collector tube inlet connected to a fraction collector by a short vertical tube with minimum restriction. Here also it would be desirable for the collector tube outlet to be open to atmospheric pressure for operating convenience.

These two desirable requirements are conflicting because, if pressure at the outlet of the collector tube is atmospheric (and pressure drop in the outlet tube is negligible), the electrophoretic cell will be at a subatmospheric pressure at the sample injection position. Consequently, with an unrestricted sample injection tube, and the sample open to atmosphere, the sample would be drawn into the cell at an excessive rate.

Since it is undesirable to place a restriction in the injection tube for reducing the flow rate, because particles may tend to settle and possibly cause clogging, the practice has been instead to lower the sample tube to a point where its meniscus is only slightly higher than the collector tube outlet. However, this is undesirale because the injection tube is then long and curved, and particles are apt to settle in it.

Another practice which has been used successfully in the past has been at best a compromise achieved by actually raising the outlet of the electrolyte drain tube outlet and the outlet of the fraction collector tube to about the mid-height of the electrophoretic cell, and lowering the sample tube as before until the meniscus of the sample is only slightly higher than the collector tube outlet. This avoids having either the sample injection tube or collector tube longer than about half the length of the electrophoresis cell. However, this is still much longer than desirable, especially for the injection tube in which particle flow must then proceed horizontally, then upwardly, and finally horizontally before going down into the cell. If sample particles have an appreciable settling rate, prefractionation and deposition of the particles may then occur in the horizontal portions of the tube.

Another desirable feature in a continuous particle electrophoresis apparatus is ability to raise the sample injection pressure abruptly to help clear the injection tube rapidly of any previous sample, and to free the injection tube of any obstructing particles.

It is a principal object of the present invention to provide a system for controlling the injection or collection pressure, or both, in a continuous particle electrophoresis apparatus.

It is a further object to provide controlled injection pressure in a continuous particle electrophoresis apparatus with a short vertical injection tube.

Another object of this invention is to provide controlled collection pressure in a continuous particle electrophoresis cell with a short vertical collector tube.

Still another object is to provide an improved means for varying the pressure over a sample in a sample injection tube of a continuous particle electrophoresis apparatus.

Yet another object is to provide a device for use in the present invention for controlling the injection pressure of a continuous particle electrophoresis apparatus without having to manipulate a shut-off valve in the electrolyte system thereof while a new sample is being placed in the apparatus.

These and other objects of the invention are achieved by connecting the electrolyte to a partially filled and closed ballast container, the upper part of which is connected by a tube to (1) an enclosed air space above the sample thereby to control injection pressure, or (2) an enclosed air space into which the collector tube drains to control collection pressure, or (3) both using separate vertical tubes, in the first case connecting the ballast container to the electrolyte supply system and in the second case to the electrolyte drain system. The meniscus of the electrolyte in the ballast container is then adjusted relative to the meniscus of the sample, or the collector tube outlet, to adjust the desired pressure. A drive motor may be attached to the ballast container, for example, in order to continuously lower the meniscus of the electrolyte as the meniscus in the sample moves downwardly to maintain a constant injection pressure or variously raise and lower the meniscus to program some variations in sample injection rate. To clear out any obstruction in the sample injection system, the ballast container can be abruptly lowered, thereby abruptly increasing the pressure over the sample.

In order to avoid causing air to enter either into the electrophoretic cell specifically or the electrolyte system generally, it is desirable to have shut-off valves between the sample reservoir tube and the sample injection outlet, and in a line leading to the ballast container from the electrolyte to supply system. The shut-off valve in the line leading to the ballast container may be avoided by a special stopper or device for the top of the sample tube, the stopper having two resilient bulbs, an outer one sealed around the upper periphery of the stopper to provide an air space connected to the electrolyte through a line, and an inner one contained entirely within the outer one and sealed around a connecting tube passing through the stopper between the inner one and an air space above the sample tube. The inner bulb prevents electrolyte from escaping from the ballast container when the device is removed from the sample tube. Thus, there is no need for a stop valve in the electrolyte line to the ballast container for the electrolyte. Both bulbs are momentarily depressed while the device is being placed in a sealing position at the upper end of the sample tube and then released thereby establishing a sub-atmospheric pressure in the air space above the sample. The inner bulb has a thin membrane wall such that a negligible pressure differential is required to expand or contract it to allow the pressures above the sample and electrolyte to equalize.

The novel features which are believed to be characteristic of the invention are set forth with particularity in the appended claims. The invention itself, however, together with further objects and advantages thereof, can best be understood by reference to the following description taken in connection with the accompanying drawings in which:

FIGURE 1 is a schematic of a system for controlling sample injection pressures in continuous particle electrophoresis apparatus;

FIGURE 2 is a schematic of a system for the control of collector tube outlet pressures in a continuous particle electrophoresis apparatus;

FIGURE 3 is a schematic of a system for controlling sample injection pressures in a continuous particle electrophoresis apparatus with a device specially devised to facilitate introducing new samples; and FIGURE 4 is a cross-section of the device specially devised for the system of FIGURE 3.

Referring now to FIGURE 1, an electrophoresis cell 10 is shown schematically. For a more complete description of a continuous particle electrophoresis cell, reference should be made to a copending application Ser. No. 481,855 of A. Strickler, filed Aug. 23, 1965, now Patent No. 3,412,007, and assigned to the assignee of the present application.

An electrolyte is introduced through an upper port 11 and, after flowing as a curtain through the cell, is removed through a lower port 12. The electrolyte is supplied from a substantially constant pressure reservoir 13 via a restrictor 14 and a conduit or line $a$.

The electrolyte removed from the cell 10 is collected in a suitable vessel 15 through a line $b$ the outlet of which is at atmospheric pressure. A sample tube 20 is connected to the cell 10 by a short vertical portion thereof having a reduced diameter and containing a stop valve 21. When the valve 21 is open, sample flows therethrough to an injection outlet 22 the position of which may be adjusted within the cell through an arc as desired for reasons more fully set forth in the aforementioned patent application.

Sample continuously introduced at the injection outlet 22 into the electrolyte curtain would flow in a narrow vertical band in the absence of a lateral potential gradient provided by means not shown. When the potential gradient is applied, the sample particles are separated into various particle groups (or components referred to as bands or fractions) depending upon the electrophoretic mobility of the respective particles. Collection of a certain fraction or band of particles may be selectively made by adjusting the position of a collector tube inlet 23 by moving it in an arc in a manner more fully described in the aforesaid copending application. Alternatively, a plurality of collector tubes may be placed along the bottom of the cell 10 so that various fractions are simultaneously collected via different collector tubes each of which drains into a separate fraction collector, such as the fraction collector 24 for the single collector tube of this illustrative embodiment of the present invention.

If the sample tube 20 were open at the top, the sample would be injected through the outlet 22 under a high pressure differential, and the band of particles selected would be drained through the collector tube outlet 25 at atmospheric pressure since the fraction collector 24 is open. The electrolyte from the reservoir 13 is normally introduced into the restrictor 14 at a positive pressure and transmitted through the line $a$ at a negative or sub-atmospheric pressure due to a pressure drop in the restrictor 14. However, the hydrostatic pressure gradually increases through the line $a$ and the electrophoretic cell 10 until, at the outlet of the line $b$ which drains into the vessel 15 the pressure is again atmospheric since the vessel 15 is open.

A pressure graph shown at the right of the system of FIGURE 1 charts the hydrostatic pressure of the electrolyte through the system. Since all flow rates in the system are low, pressure drops due to flow as such are neglected in this pressure graph except at the position of the restrictor. A vertical line 30 of the graph represents atmospheric pressure with pressure above atmospheric being shown to the right of the line and pressure below atmospheric to the left. It may be seen that the electrolyte starts at atmospheric pressure represented by a point 31 at the same level as the meniscus of the reservoir 13 and gradually increases down to the position of the restrictor 14 where the pressure drops from some positive point 32 to a sub-atmospheric point 33 and then increases again until the pressure is once again atmospheric at a point 34 at the same level as the outlet of the drain line $b$. Thus, it may be readily seen that the pressure of the electrolyte between the sample tube outlet 22 and the collector tube inlet 23 is a negative value between the points 35 and 36 of the pressure graph. With a negative pressure in the cell 10 at the position of the sample tube outlet 22, and atmospheric pressure on the sample meniscus (assuming the sample tube to be open to the atmosphere at the top), the sample will be drawn into the cell at an excessive rate. Yet the sample flow may not be reduced by excessively restricting it since a restrictor in the sample injection system could cause clogging.

As noted hereinbefore, the practice has been to lower the pressure differential between the sample meniscus and the outlet 22 by lowering the sample tube 20 until the meniscus of the sample therein is only slightly above the outlet of the drain line $b$, the sample tube 20 being then connected to the sample outlet 22 through a long curved line in which particles are apt to settle or cause clogging. A compromise has been to raise both the outlet of the curtain drain line $b$ and the collector tube outlet 25 to about mid-height of the cell 10 and to lower the meniscus of the sample to a point where it is only slightly higher than this level. However, the particle flow must still proceed horizontally, then upwardly and finally horizontally before going down into the cell so that deposition of particles in the horizontal portions and prefractionation in the long vertical portions of the tube is still a problem.

The present invention avoids the problem of prefractionation and deposition of particles by employing a short vertical sample tube 20 passing directly into the electrophoretic cell 10 and having only a stop valve 21 in a portion having a reduced diameter and preferably of the same diameter as the sample injection outlet 22. In a commercial embodiment of the present invention, the reduced portion of the sample tube 20 containing the stop valve 21 may actually be a tube or line of suitable material connecting an outlet at the bottom of a vessel containing the sample to an injection tube permanently mounted in the electrophoresis cell 10. However, for ease in describing the present invention, the short vertical sample tube 20 is considered to be one integral piece from the top thereof to the sample injection outlet 22 with a stop valve 21 as shown. Therefore, the term short vertical sample tube as used hereinafter is to be construed to cover all equivalent arrangements.

In accordance with the present invention, a ballast container 40 is provided and coupled to the line $a$ by a line $d$. The container 40 is so positioned that it is filled approximately midway with electrolyte leaving an air space 41 enclosed by a stopper 42 as shown. An air space 43 in the short vertical sample tube 20 is also enclosed by a stopper 44 and coupled to the air space 41 by a line $e$ thereby allowing the pressure in the vertical tube 20 to equalize with the pressure in the ballast container 40.

To control the sample injection rate or pressure differential between the sample meniscus and the interior of the cell 10 at the level of the injection outlet 22, the meniscus of the sample in the tube 20 is adjusted relative to the meniscus of the electrolyte in the container 40, the latter being at a level where the pressure is not atmospheric but rather sub-atmospheric. When the meniscus of the sample in the tube 20 is level with the meniscus of the electrolyte in the container 40, the pressure at both menisci is at the same sub-atmospheric point 45 indicated in the pressure graph. Accordingly the liquid levels in tubes 20 and 40 are in pressure equilibrium with each other and with the electrolyte in the cell 10 and the electrolyte supply line $a$. Under these conditions there is no flow of sample from tube 20 into the electrophoresis cell 10.

To initiate sample injection, the sample tube 20 must be raised slightly, or the ballast tube 40 lowered slightly. In either case, there will be an outflow of sample from tube 10, with a slow drop in its meniscus level, while the meniscus level in ballast tube 40 slowly rises. If there were no further shifting of the tube levels, the menisci in both tubes would arrive at a new but equal level and flow would again cease. While the sample tube could be made flexible to vary the level of the meniscus, it is preferable to maintain the sample tube fixed in space and to adjust the level of the electrolyte meniscus since moving it up and down will have the same but converse effect as moving the sample meniscus.

As the sample in the tube is injected into the cell 10, the meniscus of the sample gradually moves down, thereby gradually decreasing the sample injection rate at the outlet 22. Therefore, to maintain a constant sample injection rate, the electrolyte tube 40 may be gradually moved down by a motor 50 (or by hand as when sample injection rate is relatively slow). Alternatively, the motor 50 may be coupled to the electrolyte 40 through, for example, a cam, to vary the sample injection pressure in accordance with some predetermined program.

To change the sample in the tube 20, the stop valve 21 is closed and the stopper 44 of the tube 20 is removed. However, since removing the stopper 44 from the tube 20 exposes the line $e$ to atmospheric pressure, air could be drawn into the electrolyte system. Since it is undesirable to have air in the system generally and in the cell 10, in particular, a stop valve 51 is provided to shut off the line $d$ from the line $e$ before the stopper 44 is removed from the tube 20. Once the new sample has been placed in the tube 20, and the stopper 44 securely replaced, the valve 51 is again opened and the meniscus of the electrolyte in the container 40 is adjusted for the desired pressure differential or flow rate. The valve 21 is then once again opened. It is sometimes desirable to quickly flush out any part of the old sample that may have remained in the lower part of the tube 20. To accomplish that, the pressure differential could be momentarily increased by lowering the container 40 and then returning it to its desired level. To clear out any clogging particles, the flushing may be done abruptly.

Although the sub-atmospheric pressure of the electrolyte in the line $a$ is preferably used to couple to and control the pressure of the sample at a desired sub-atmospheric point, it may be readily appreciated that in some applications it may be desirable to use some other sub-atmospheric hydraulic pressure system in a similar fashion. If so, the pressure control function of the container 40 remains the same. Accordingly, considering the present invention in its broadest aspects, the ballast container 40 may be more properly referred to as a pressure control container or more simply as a control container. Only in the special case of the preferred embodiment illustrated in FIGURE 1 could the control container be more logically denominated an electrolyte tube.

The control container 40 is connected to the electrolyte system at any convenient level. However, it is usually coupled to a portion of the system which is, relatively, in hydrostatic equilibrium with the interior of cell 10, into which the injection tube 22 must vent. In the system shown in FIGURE 1, the curtain flow rate is set by the restrictor 14 across which there is an appreciable pressure drop. This means that control container 40 must couple to a point below the restrictor 14 and consequently to a position of sub-atmospheric pressure.

It should be noted that although an electrolyte system employing a restrictor is preferred, in some continuous flow electrophoresis apparatus the same relative pressure differential may be maintained by providing some means for maintaining the pressure at the outlet of the tube $b$ at some level other than atmospheric, in which case the pressure graph trace would simply be moved to the left or the right with respect to vertical line 30. The line $d$ would still be connected to the electrolyte system in the same relative position.

To summarize, when the menisci of the liquids in the tubes 20 and 40 are at the same level as shown, pressures in the air spaces 41 and 43 are equal and sub-atmospheric. Under those conditions there will be no sample flow although the electrolyte will continue to flow through the cell 10. Sample flow is initiated by lowering the electrolyte tube 40, thereby causing electrolyte to rise until pressure equilibrium is again restored in the air spaces 41 and 43. However, when equilibrium is restored, the meniscus of the electrolyte will not have risen to its former absolute level. Air displaced from the space 41 passes through the line $e$ into the space 43 in the sample tube 20 and an equivalent volume of sample is injected into the cell 10.

It may be shown that if the control tube is lowered by an amount $\Delta H$, then the volume $\Delta V$ displaced from the sample tube when equilibrium is once again restored is given by the following equation:

$$\Delta V = \frac{\Delta H \pi}{4} \left( \frac{D_s^2 D_c^2}{D_s^2 + D_c^2} \right) \qquad (1)$$

where $D_s$ and $D_c$ are the internal diameters of the sample and control tubes respectively measured at the menisci.

For sensitive control of flow, the internal diameter $D_c$ of the control tube 40 is best made smaller than that of the sample tube 20 although, for simplicity, they are illustrated in FIGURE 1 as being of the same diameter. Sensitivity enhancement may be expressed as the ratio of $\Delta H$ to the amount $\Delta H_s$ by which the sample meniscus drops and is given by the following equation:

$$\frac{\Delta H}{\Delta H_s} = \frac{4}{\pi}\left(\frac{D_s^2 + D_c^2}{D_s^2 D_c^2}\right) \qquad (2)$$

An advantage of this invention is that it allows for a convenient way to feed the sample into a continuous particle electrophoresis apparatus continuously and adjustably. As suggested hereinbefore, the motor 50 may be adapted to move the electrolyte tube down slowly, as by a lead screw drive, to maintain the rate of sample feed constant or in some other manner, as by a cam, to vary the flow rate in some other manner. The rate of sample feed relative to the rate of the electrolyte tube lowering is given by the following equation:

$$\frac{dV}{dH} = \frac{\pi}{4}\left(\frac{D_s^2 D_c^2}{D_s^2 + D_c^2}\right) \qquad (3)$$

The quantitative relationships shown neglect the small pressure and total volume changes in the combined air spaces in the tubes.

Referring now to FIGURE 2, the same general pressure control arrangement illustrated in FIGURE 1 for sample injection may be used for particle band or fraction collection by controlling the pressure at the collector tube outlet 25. To accomplish that, a ballast container 60 is again connected to the electrolyte system by a line $f$, this time above restrictor 65, at a point where the pressure is above that at the outlet of the line $b$ the latter being at atmospheric pressure where it vents to vessel 15. The fraction collector 24 and ballast container 60 are closed by stoppers 61 and 62 to provide air spaces 63 and 64 coupled by a line $g$.

The restrictor 65 is placed in the electrolyte drain line $b$ in order to control the flow of curtain liquid.

In operation, the system of FIGURE 2 provides collection rate control by control of the pressure differential between the collector tube inlet 23 and the air space of the fraction collector 24. When the meniscus of the electrolyte in the control tube 60 is at the same level as the collector tube outlet 25, and pressure at both these positions is the same as that found in the line $b$ at the same level, the system is at equilibrium and no fractions are collected. If the ballast container 60 is raised, the electrolyte meniscus will fall slowly within the tube, increasing the air space 64 and decreasing pressure therein. Since the air space 65 in the collector is coupled to the air space 63 in the ballast container 60 by the line $g$, the pressure at the fraction collector outlet 25 is decreased, thereby initiating fraction flow.

It should be noted that the effect of the flow being controlled by the ballast container 60 is opposite that of the ballast container 40 in the system of FIGURE 1 because in the latter an inward flow to thte electrophoresis cell is required whereas in the system of FIGURE 2 an outward flow is required.

It should be noted that pressure in the air spaces 63 and 64 may in practice actually be higher or lower than atmospheric, depending upon the electrolyte system pressure at a level equal to the collector tube outlet 25 in the collector 24. Thus, if the arrangement of FIGURE 2 were modified such that the restrictor controlling curtain flow were between the curtain feed reservoir and the cell 10, as in FIGURE 1, pressure in the air spaces 63 and 64, as well as in the corresponding level of tube $b$, would be subatmospheric. When a "hybrid" system is used, i.e. have flow restrictors both above and below the cell 10, the pressures in the air spaces 41, 43, 63 and 64 will depend then upon the ratio of the pressure drops in the two restrictors. In practice, in such an arrangement, pressure in the spaces 43, 41 would still usually be subatmospheric, and that in spaces 63, 64 above atmospheric, while the level at which pressure in the system is atmospheric might be somewhere about mid-height in cell 10. In any event, these variations do not alter the mode of connection or operation of the sample and fraction collection systems shown in FIGS. 1 and 2.

Although it is customary procedure to close a valve in the sample injection system of analytical instruments such as a continuous particle electrophoresis apparatus to which the present invention pertains, it is not customary to have other valves which must be shut off in order to place a new sample in the instrument. Accordingly, in order to simplify the procedures for placing a new sample in an apparatus embodying the present invention as shown in FIGURE 1, it is desirable to eliminate the need for the valve 51 so that only the valve 21 need be closed to place a new sample in the instrument. FIGURE 3 illustrates a system in which the valve 51 of FIGURE 1 has been eliminated.

To facilitate understanding the system of FIGURE 3, elements corresponding to those shown in the system of FIGURE 1 have been designated by the same reference character, but distinguished by a prime (').

One difference between the system of FIGURE 3 and that of FIGURE 1 is the more perfect constant pressure reservoir 13' of the overflow type which may be used in place of the siphon type illustrated in FIGURE 1. However, neither the siphon-type reservoir 13 of FIGURE 1 nor the overflow reservoir 13' of FIGURE 3 is essential to this invention. Other substantially constant pressure sources of electrolyte may be used. However, the overflow type is of course more constant and more economical since it only requires a supply reservoir (not shown) from which electrolyte is pumped to the constant pressure reservoir 13' over a line $h$. The electrolyte level rises in the reservoir 13' until it overflows through a line $k$ back into the supply reservoir, and then remains constant to maintain a constant hydrostatic pressure on the electrolyte system.

A more significant difference between the system of FIGURE 3 and that of FIGURE 1 is the absence of any shut-off valve in the line $d'$ connecting the ballast container 40' to the electrolyte system and a different configuration for the stopper 44' which makes elimination of the valve in the line $d'$ possible. That special device allows the air space 43' of the sample tube 20' to be uncovered without releasing or opening the air space 41' of the ballast container to atmosphere. The device, shown in an enlarged section in FIGURE 4, consists of a stopper 70 that fits into the sample tube 20' and two resilient bulbs 71 and 72, the outer bulb 71 being sealed around the upper periphery of the stopper 70 to provide an air space 73 connected to the electrolyte system through a line $e'$, and an inner bulb 72 contained entirely within the outer one and sealed around a connecting tube 75 passing through the stopper between the air space 43' above the sample in the tube 20' and the inside of the inner bulb 72.

When the device is removed from the sample tube 20', the space 74 inside the inner bulb 72 is filled with air at atmospheric pressure through the line 75. Since the line $e'$ is connected to a sub-atmospheric pressure, the inner bulb 72 will expand to the point where it supports the atmospheric pressure at its inner surface. This expansion may extend to the point of contact with the wall of the outer bulb 71. In that manner, air at atmospheric pressure is not permitted to enter the line $e'$ and force electrolyte from the ballast container back through the line $d'$ to the line $a'$. If air at atmospheric pressure were not prevented from entering the line $e'$, the entire electrolyte system could be filled with air, including the cell 10, and considerable time would be wasted in recharging the system with electrolyte.

Once the tube 20' has been refilled with a sample, the special stopper device 44' is brought over tube 20 for sealing the air space 43' but in doing so, and before sealing is effected, both bulbs are momentarily depressed. The bulbs are then released after the device is in a sealing position. When the bulbs are released, a subatmospheric pressure is retored in both of the air spaces 73 and 74. The inner bulb has a thin membrane wall such that negligible pressure differential is required to expand or contract it. In that manner, the air trapped in the air space 43' is allowed to pass through the line 75 and expand into the air space 74 until an equilibrium at some sub-atmospheric pressure is reached in the air spaces 43, 74 and 73. As the relative levels in the ballast tube 40' and sample tube 20' are varied to adjust the sample flow rate (in the manner more fully described hereinbefore with reference to FIGURE 1), the thin membrane wall of the bulb 72 allows air space 43' in the sample tube 20' to continuously equalize with the pressure in the air space 41' of the ballast container.

While the principles of the invention have now been made clear in an illustrative embodiment, obvious modifications particularly adapted for specific environments and operating requirements may be made without departing from those principles. The appended claims are therefore intended to embrance any such modifications.

What is claimed is:

1. In a continuous particle electrophoresis apparatus comprising means defining an electrophoresis cell, an electrolyte system for providing a continuous and uniform flow of electrolyte from a reservoir to a suitable collecting vessel, said flow through said cell being in a curtain, and a sample injection and fraction collection system for injecting a sample upstream in the electrolyte curtain and collecting a selected band of particles through a collector tube which drains into a fraction collector, the combination comprising: an enclosed ballast container connected to the electrolyte system through a line which allows the electrolyte to seek a level in said container which depends upon its position relative to the electrolyte system to establish air pressure in a first enclosed space over said electrolyte within said container, a second enclosed air space surrounding a point in the sample injection and fraction collection system at which pressure is to be controlled; a line coupling said first air space to said second air space thereby allowing the air pressure in said second air space to balance with the air pressure in said first air space to control the pressure at said point; said point at which pressure is to be controlled being adjustable relative to said level in said container to adjust flow rate in said sample injection and fraction collection system.

2. The combination as defined in claim 1 wherein said ballast container is connected to said electrolyte system upstream from said electrophoresis cell, and said point at which pressure is to be controlled is an enclosed air space directly above a sample in a tube so connected to said cell as to inject sample in the electrolyte curtain.

3. The combination as defined in claim 2 comprising a substantially constant pressure source of electrolyte coupled by a restrictor to the line connecting the ballast container to the electrolyte system having a line open to atmospheric pressure at the lower end thereof for draining electrolyte into said vessel, thereby providing a sub-atmospheric pressure in the electrolyte from a point above the sample tube to the lower end of said drain line.

4. The combination as defined in claim 2 wherein the surface area of said electrolyte in said ballast container remains substantially constant as said ballast container is adjusted in height, the surface area of said sample tube remains substantially constant as said sample is injected into said cell, and the latter surface area is smaller than the former surface area.

5. The combination as defined in claim 2 comprising a motor for moving said ballast container in height relative to said electrolyte system while the position of said point at which pressure is to be controlled remains substantially constant.

6. The combination as defined in claim 5 wherein said tube is a short, fixed-length, vertical tube.

7. A combination as described in claim 2 where said enclosed air space directly above the sample in said tube is provided by a device comprising a stopper for sealing the top of said tube, and two resilient bulbs, an outer bulb sealed around the upper periphery of the stopper to provide an air space, and an inner bulb contained entirely within the outer one and sealed around a connecting tube passing through the stopper, said inner bulb providing another air space contained entirely within the air space provided by said outer bulb, said connecting tube passing through the stopper to provide a conduit for the passage of air between the air space provided by said inner bulb and the air space above the sample in said tube, and a line coupling said air space between said inner and outer bulbs to the air space in said ballast container.

8. The combination as defined in claim 1 wherein said ballast container is connected to said electrolyte system downstream from said electrophoresis cell, and said point at which pressure is to be controlled is at the outlet of said fraction collection system.

9. The combination as defined in claim 8 comprising a substantially constant pressure source of electrolyte coupled by a restrictor to the electrolyte system having a line open to atmospheric pressure at the lower end thereof for draining electrolyte into said vessel, thereby providing a subatmospheric pressure in the electrolyte from a point above the sample injection system to the lower end of said drain line.

10. The combination as defined in claim 9 wherein said sample injection system comprises a short vertical tube the lower end of which extends into said cell and terminates at a sample injection outlet.

References Cited

UNITED STATES PATENTS

| 2,555,487 | 6/1951 | Haugaard et al. | 204—180 |
| 3,085,956 | 4/1963 | Caplan | 204—180 |
| 3,125,500 | 3/1964 | Grassman et al. | 204—299 |
| 3,127,336 | 3/1964 | Chemla | 204—180 |
| 3,305,471 | 2/1967 | Münchhausen et al. | 204—299 |

JOHN H. MACK, Primary Examiner

A. C. PRESCOTT, Assistant Examiner

U.S. Cl. X.R.

204—180